United States Patent
Fujimoto et al.

(10) Patent No.: US 6,641,905 B1
(45) Date of Patent: Nov. 4, 2003

(54) POWER TRANSMISSION BELT AND PROCESS FOR PRODUCTION OF THE SAME

(75) Inventors: Hiroshi Fujimoto, Hyogo (JP); Katuyoshi Fujiwara, Hyogo (JP)

(73) Assignee: Bando Chemical Industries, Ltd., Kobe (JP)

( * ) Notice: Subject to any disclaimer, the term of this patent is extended or adjusted under 35 U.S.C. 154(b) by 0 days.

(21) Appl. No.: 09/701,639

(22) PCT Filed: Apr. 17, 2000

(86) PCT No.: PCT/JP00/02511

§ 371 (c)(1),
(2), (4) Date: Feb. 16, 2001

(87) PCT Pub. No.: WO00/63581

PCT Pub. Date: Oct. 26, 2000

(30) Foreign Application Priority Data

Apr. 19, 1999 (JP) .............................. 11-111244

(51) Int. Cl.[7] .............................................. B32B 27/12
(52) U.S. Cl. ............... 428/297.4; 428/295; 428/297.7; 264/501; 264/504; 264/512; 264/519; 264/523; 264/531
(58) Field of Search .................. 428/297.4, 297.7, 428/295.1; 264/501, 504, 512, 519, 523, 531, 345

(56) References Cited

FOREIGN PATENT DOCUMENTS

| EP | 685661 | | 12/1995 |
|----|--------|---|---------|
| EP | 688810 | | 12/1995 |
| JP | 59-89375 | | 5/1984 |
| JP | 59-125975 | | 7/1984 |
| JP | 60099184 | * | 6/1985 |
| JP | 62205131 | * | 9/1987 |
| JP | 6-346948 | | 12/1994 |
| JP | 10-9345 | | 1/1998 |
| JP | 11-6546 | | 1/1999 |

* cited by examiner

Primary Examiner—Merrick Dixon
(74) Attorney, Agent, or Firm—Merchant & Gould P.C.

(57) ABSTRACT

There is provided a power transmission belt which comprises a compression layer and an adhesive rubber layer which are adhered to each other by vulcanizing together and which has polyester fiber cords embedded in the adhesive rubber layer, wherein the compression layer and the adhesive rubber layer are formed of vulcanizate of an ethylene-α-olefin-diene rubber compound and wherein the polyester fiber cords are adhesion treated with a resorcin-formalin-rubber latex adhesive composition wherein the rubber latex comprises at least one of chlorosulfonated polyethylene and alkylated chlorosulfonated polyethylene in an amount of 50–100% by weight based on the solid components of the rubber latex and adhered to and embedded in the adhesive rubber layer. A process for the production of such power transmission belt is also provided.

5 Claims, 2 Drawing Sheets

POWER TRANSMISSION BELT AND PROCESS FOR PRODUCTION OF THE SAME

BACKGROUND OF THE INVENTION

1. Field of the Invention

This invention relates to a power transmission belt. More particularly, the invention relates to a power transmission belt which comprises a compression layer and an adhesive rubber layer both of which are formed of a vulcanizate of an ethylene-α-olefin-diene rubber compound and which has a plurality of lord carrying cords formed of polyester fibers embedded in the adhesive rubber layer. The power transmission belt of the invention has excellent dynamic adhesion between the lord carrying cords and the adhesive rubber layer, and hence, it has an extended dynamic belt life. The invention further relates to a process for the production of such a power transmission belt.

2. Description of the Prior Art

In general, a power transmission belt comprises a compression layer and an adhesive rubber layer, and a plurality of lord carrying cords are adhered to and embedded in the adhesive rubber layer. Optionally, the belt has a rubberized canvas or reinforcing fabric on the upper face or the inner face or on the whole surfaces including the side faces.

For the production of a power transmission belt, in particular, a compression layer of the belt, chloroprene rubber or a mixture of hydrogenated nitrile rubber and chlorosulfonated polyethylene has been used heretofore. However, in recent years, an attempt has been made to use ethylene-α-olefin-diene rubber for the production of an adhesive rubber layer as well as a compression layer to meet a demand of "chlorine free" products from the standpoint of environmental protection.

However, as known in the art, ethylene-α-olefin-diene rubber has a defect that it is inferior in dynamic properties, in particular, in resistance to fatigue and wear, and tensile strength. In addition, it has poor adhesion to lord carrying cords of polyester fibers. Such being the case, it has been considered difficult to use ethylene-α-olefin-diene rubber to produce power transmission belts in which dynamic properties are important requisites.

SUMMARY OF THE INVENTION

The present inventors have made intensive investigation to realize a power transmission belt having excellent dynamic properties which comprises a compression layer and an adhesive rubber layer both of which are formed of ethylene-α-olefin-diene rubber compound and which has a plurality of lord carrying cords formed of polyester fibers (hereinafter referred to polyester fiber cords) bonded to and embedded in the adhesive rubber layer. As results, the inventors have found that the treatment of the polyester fiber cords with a resorcin-formalin-rubber latex adhesive composition wherein the rubber latex in the composition contains at least one of a chlorosulfonated polyethylene and an alkylated chlorosulfonated polyethylene therein as solid components (rubber components) provides excellent dynamic adhesion between the polyester fiber cords and the adhesive rubber layer.

Thus, they have obtained a power transmission belt having excellent dynamic properties which comprises a compression layer and an adhesive rubber layer both of which are formed of ethylene-α-olefin-diene rubber compound and which has a plurality of polyester fiber cords bonded to and embedded in the adhesive rubber layer. Thus, they have completed this invention.

The inventors have further found that the incorporation of a specific metal oxide and a sulfur containing vulcanization accelerator in the resorcin-formalin-rubber latex adhesive composition and the use of such an adhesive composition for treatment of the polyester fiber cords further improves dynamic adhesion between the polyester fiber cords and the adhesive rubber layer even if the polyester fiber cords are dipped in the adhesive composition and dried at a temperature as high as 200° C. or more, and accordingly they can manufacture power transmission belts formed of ethylene-α-olefin-diene rubber and having polyester fiber cords embedded therein in a very high productivity.

The invention has been completed to solve the above-mentioned problems in the known power transmission belts formed of ethylene-α-olefin-diene rubber. Accordingly, it is an object of the invention to provide a power transmission belt which comprises a compression layer and an adhesive rubber layer which are formed of ethylene-α-olefin-diene rubber and adhered to each other by vulcanizing together and, which comprises polyester fiber cords adhered to and embedded in the adhesive rubber layer, has and improved dynamic adhesion therebetween.

It is a further object of the invention to provide a process for the production of a power transmission belt as mentioned above.

The invention provides a power transmission belt which comprises a compression layer and an adhesive rubber layer which are adhered to each other by vulcanizing together and which has a plurality of polyester fiber cords embedded in the adhesive rubber layer, wherein the compression layer and the adhesive rubber layer are formed of vulcanizate of an ethylene-α-olefin-diene rubber compound and wherein the polyester fiber cords are adhesion treated with a resorcin-formalin-rubber latex adhesive composition wherein the rubber latex comprises at least one of chlorosulfonated polyethylene and alkylated chlorosulfonated polyethylene in an amount of 50–100% by weight based on the solid components (rubber components) of the rubber latex and adhered to and embedded in the adhesive rubber layer.

The invention further provides a process for production of a power transmission belt which comprises a compression layer and an adhesive rubber layer which are adhered to each other by vulcanizing together and which has a plurality of polyester fiber cords embedded in the adhesive rubber layer, which comprises:

carrying out adhesion treatment of the polyester fiber cords which comprises impregnating the polyester fiber cords with a resorcin-formalin-rubber latex adhesive composition wherein the rubber latex contains at least one of chlorosulfonated polyethylene and alkylated chlorosulfonated polyethylene in an amount of 50–100% by weight based on the solid components (rubber components) of the rubber latex as well as at least one metal oxides and at least one sulfur containing vulcanization accelerators, and heating and drying the resulting polyester fiber cords at a temperature of 200–240° C.;

placing the resulting polyester fiber cords between a pair of sheets formed of unvalcanized ethylene-α-olefin-diene rubber compound which are to form an adhesive rubber layer;

laminating the said pair of sheets formed of unvalcanized ethylene-α-olefin-diene rubber compound on a sheet formed of unvalcanized ethylene-α-olefin-diene rubber compound which is to form a compression layer; and heating the resulting laminate under pressure to vulcanize the laminate in a body to provide the belt, wherein the polyester fiber cords are adhered to and embedded in the adhesive rubber layer.

DESCRIPTION OF PREFERRED EMBODIMENTS OF THE INVENTION

Figure 1:
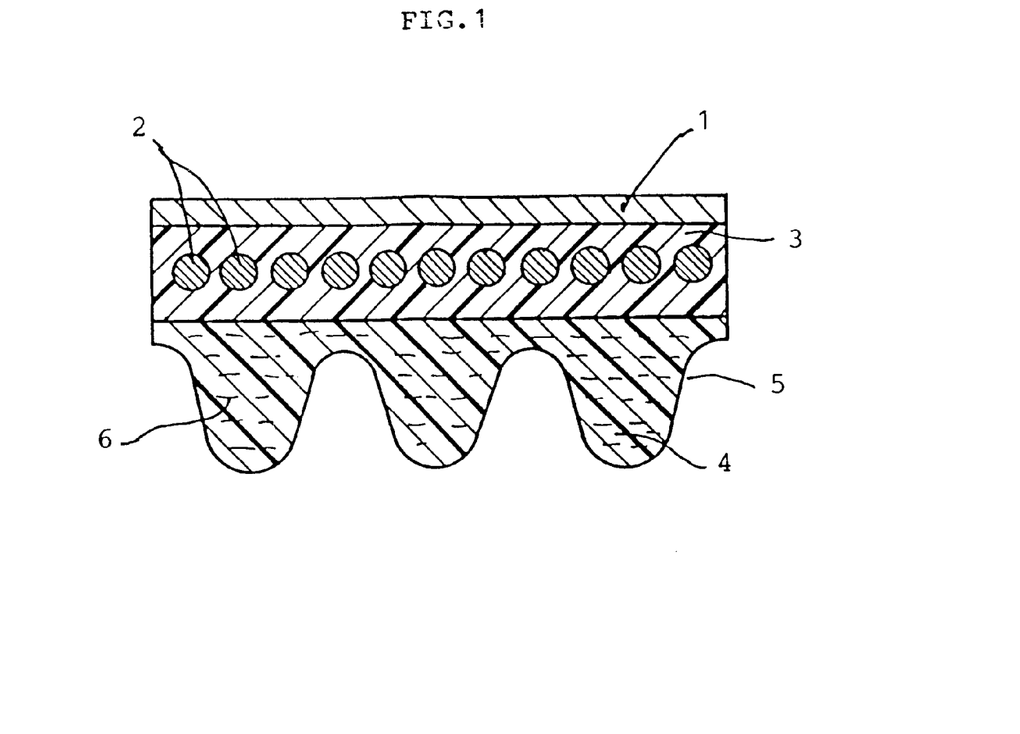
FIG. 1 shows a cross section of an example of a V-ribbed belt.

The power transmission belt includes herein the specification V-ribbed belts and V-belts. FIG. 1 shows a cross section of an example of a V-ribbed belt. The belt has an upper face covered with one or more sheets of rubberized reinforcing fabric or canvas 1. In adjacent to the upper face, the belt has an adhesive rubber layer 3 in which a plurality of polyester fiber cords 2 of low elongation are embedded, laterally apart and extending in the longitudinal direction of the belt. In turn, a compression layer 5 that has a plurality of ribs 4 is laminated on the adhesive rubber layer. The ribs are laterally apart and extends in the longitudinal direction of the belt. In many cases, the compression layer has short fibers dispersed therein which are oriented along the width direction of the belt so that the belt has improved resistance to lateral pressure.

Figure 2:
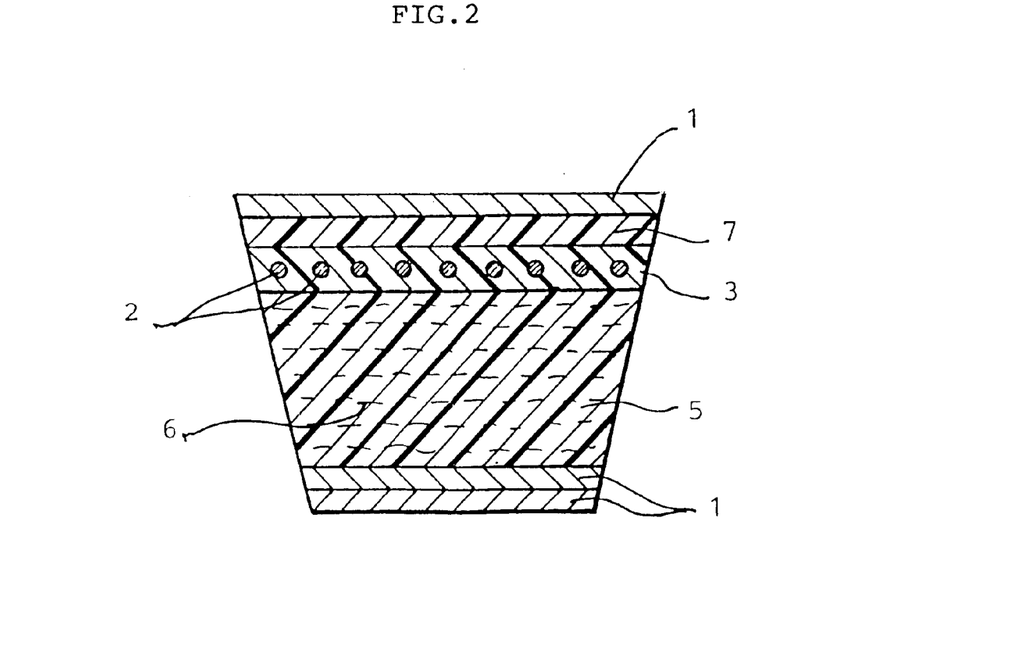
FIG. 2 shows a cross section of an example of a V-belt.

FIG. 2 shows a cross section of an example of a V-ribbed belt. In the same manner as above, the belt has an upper face covered with one or more sheets of rubberized reinforcing fabric or canvas 1. Optionally, the belt has a tension layer 7 under the reinforcing fabric laminated thereto. In adjacent to the tension layer, the belt has an adhesive rubber layer 3 in which a plurality of polyester fiber cords 2 of low elongation are embedded. In turn, a compression layer 5 is laminated on the adhesive rubber layer. In many cases, the compression layer has short fibers dispersed therein which are oriented along the width direction of the belt so that the belt has improved resistance to lateral pressure. The compression layer usually are covered with one or more sheets of rubberized reinforcing fabric or canvas 1.

In the power transmission belt of the invention, the compression layer and the adhesive rubber layer are vulcanized together and adhered to each other and the polyester fiber cords are adhered to and embedded in the adhesive rubber layer. If necessary, the upper face or the inner face or the whole surfaces including the side faces have rubberized reinforcing fabric adhered thereto. The compression layer and the adhesive rubber layer are formed of vulcanizate of ethylene-α-olefin-diene rubber compound.

The ethylene-α-olefin-diene rubber used in the invention is a copolymer rubber formed of ethylene, an α-olefin except ethylene and a diene (non-conjugated diene), a partially halogen substituted product of the rubber or a mixture of these. The α-olefin is preferably at least one of propylene, butene, hexene and octene. Preferred ethylene-α-olefin-diene rubber used in the invention is ethylene-propylene-diene rubber or a partially halogen substituted product of the rubber, especially a partially chlorine substituted product of the rubber, or a mixture of these.

It is preferred that the ethylene-α-olefin-diene rubber used in the invention contains 50–80% by weight of ethylene, 50–20% by weight of propylene and a non-conjugated diene component in such an amount that the resultant rubber has an iodine value of not more than 50, preferably in the range of 4–40, and has a Mooney viscosity $ML_{1+4}$ (100° C.) of 20–120. The diene component includes non-conjugated dienes such as 1,4-hexadiene, dicyclopentadiene or ethylidene norbornene, although the diene component usable is not limited thereto.

According to the invention, polyester fiber cords are used as load carrying cords, and inter alia, polyethylene terephthalate or polyethylene naphthalate is preferred. The polyester fiber cords are impregnated with a resorcin-formalin-rubber latex adhesive composition (often referred to an RFL adhesive composition hereafter) wherein the rubber latex contains at least one of chlorosulfonated polyethylene and alkylated chlorosulfonated polyethylene in an amount of 50–100% by weight of the solid components of the rubber latex and adhered to and embedded in the adhesive rubber layer.

The chlorosulfonated polyethylene rubber is a rubber obtained by the reaction of chlorine and sulfur dioxide and it has chlorosulfonyl groups as vulcanizing points. It contains chlorine usually in an amount of 15–45% by weight, preferably in an amount of 25–35% by weight, and sulfur usually in an amount of 0.5–2.5% by weight. The alkylated chlorosulfonated polyethylene is reduced in the amount of polar atoms or chlorine atoms and instead it has alkyl groups therein to decrease the crystallinity of molecules so that the rubber is balanced in low temperature properties (cold resistance) and elasticity. It contains chlorine usually in an amount of 25–35% by weight and sulfur usually in an amount of not more than 1% by weight, preferably in an amount of 0.6–0.8% by weight.

The RFL adhesive composition used in the invention is usually prepared by condensing resorcin (R) with formalin (F) in a resorcin/formalin molar ratio in the range from 1/3 to 3/1 in the presence of a basic catalyst to prepare an aqueous solution of resorcin-formalin resin (resorcin-formalin primary condensate, hereafter referred to an RF resin) in a concentration of 5–80% by weight, and then mixing the solution with a rubber latex (L). The solid content of RFL adhesive composition is usually in the range of 10–50% by weight.

According to the invention, the polyester fiber cords are adhesion treated with the RFL adhesive composition. The rubber latex used in the RFL adhesive composition contains at least one of chlorosulfonated polyethylene and alkylated chlorosulfonated polyethylene in an amount of 50–100% by weight, preferably in an amount of 60–100% by weight, based on the solid components of the rubber latex. The thus treated polyester fiber cords are then placed between a pair of unvulcanized sheets of ethylene-α-olefin-diene rubber compound which are to form an adhesive rubber layer. The sheets are then laminated on an unvulcanized sheet of ethylene-α-olefin-diene rubber compound which is to form a compression layer, heated under pressure and vulcanized together in a body to provide the power transmission belt of the invention.

In more detail, for example, the polyester fiber cords are dipped in the RFL adhesive composition and are then heated (i.e., baked) and dried at a temperature of 200–240° C., preferably at a temperature of 210–235° C., to fix the RFL adhesive composition on the polyester fiber cords. However, if necessary, the polyester fiber cords may be heated (i.e., baked) at a temperature of 150–200° C., preferably at a temperature of 170–200° C., after dipping in the RFL adhesive composition.

According to the invention, it is preferred that the polyester fiber cords are first dipped in a first RFL adhesive composition and heated and dried to effect the first RFL treatment, and are then dipped in a second RFL adhesive composition and heated and dried to effect the second (or final) RFL treatment. That is, it is preferred that the adhesion treatment of polyester fiber cords be carried out at least twice in this way. The first and second RFL adhesive composition used may be the same or may not. If necessary, the treatment may be carried out three times or more.

As rubber components, in addition to at least one rubber selected from the group consisting of chlorosulfonated polyethylene and alkylated chlorosulfonated polyethylene, which is referred to a first rubber, the latex contained in the RFL adhesive composition used in the invention may contain a second rubber. The second rubber is preferably a rubber comprised of 2-chloro-1,3-butadiene and 2,3-dichloro-1,3-butadiene (DCB).

The use of RFL adhesive composition in which the rubber latex contains a copolymer of 2-chloro-1,3-butadiene and 2,3-dichloro-1,3-butadiene (DCB) as the second rubber together with the first rubber therein forms much stronger adhesion between the RFL adhesive composition and the polyester fiber cords. Consequently, the resulting belt has a much extended dynamic life.

When the rubber latex contains the second rubber as mentioned above, the latex contains the first rubber in an amount of not less than 50% by weight, preferably in an amount of 55–95% by weight, most preferably in an amount of 60–90% by weight, and the second rubber in an amount of not more than 50% by weight, preferably in an amount of 5–45% by weight, most preferably in an amount of 10–40% by weight.

In this way, according to the invention, the polyester fiber cords are adhesion treated with the RFL adhesive composition which contains a rubber latex wherein at least one rubber selected from chlorosulfonated polyethylene and alkylated chlorosulfonated polyethylene is main rubber components, placed between a pair of unvulcanized sheets of ethylene-α-olefin-diene rubber compound which are to form an adhesive rubber layer, and the pair of unvulcanized rubber sheets are vulcanized together with the fiber cords to embed the fiber cords in the vulcanized adhesive rubber layer. Thus, high dynamic adhesion is attained between the polyester fiber cords and the adhesive rubber layer. The belt of the invention has the polyester fiber cords vulcanized and adhered to the adhesive rubber layer in a body so that it has a much extended dynamic life.

According to the invention, it is further preferred that the RFL adhesive composition contain at least one specific metal oxides and at least one sulfur containing vulcanization accelerators. The dynamic adhesion between the polyester fiber cords and the adhesive rubber layer is further improved, but also the time required to carry out the adhesion treatment of the polyester fiber cords is remarkably reduced when the polyester fiber cords are dipped in the RFL adhesive composition containing at least one such metal oxides and at least one sulfur containing vulcanization accelerators in addition the RF and the latex, and heated and dried at a temperature of not less than 200° C. Thus, the process of the invention enables to produce power transmission belts having polyester fiber cords embedded in the adhesive layer and having excellent dynamic adhesion in very high productivity.

The metal oxide used in the invention includes, for example, zinc oxide, magnesium oxide and lead oxide. The metal oxide is used alone or as a mixture of two or more of these. Among these, zinc oxide is preferred. In turn, the sulfur-containing vulcanization accelerator used in the invention includes, for example, thiazoles, sulfenamides (sulfenic acid amides), thiurams and dithiocarbamates. The sulfur-containing vulcanization accelerator is used alone or as a mixture of two or more of these. The sulfur containing vulcanization accelerator is more effective for acceleration of vulcanization of ethylene-α-olefin-diene rubber than for acceleration of vulcanization of chlorosulfonated polyethylene rubber or alkylated chlorosulfonated polyethylene rubber.

There may be mentioned as examples of the thiazoles, for example, 2-mercaptobenzothiazole (M) and their salts (such as zinc salt, sodium salt, cyclohexylamine salt) and dibenzothiazyl disulfide (DM), among others. There may be mentioned as examples of the sulfenamides, for example, N-cyclohexyl-2-benzothiazyl sulfenamide (CZ); and as thiurams, for example, tetramethylthiuram monosulfide (TS), tetramethylthiuram disulfide (TT) and dipentamethylenethiuram tetrasulfide (TRA); as the dithiocarbamates, for example, sodium di-n-butyl dithiocarbamate (TP), zinc dimethyldithiocarbamate (PZ) and zinc diethyldithiocarbamate (EZ), among others.

The metal oxide is contained in the RFL adhesive composition usually in an amount of 0.1–10 parts by weight relative to 100 parts by weight of solid components in the RFL adhesive composition while the sulfur-containing vulcanization accelerator usually in an amount of 0.1–20 parts by weight relative to 100 parts by weight of solid components in the RFL adhesive composition.

As mentioned above, in accordance with the invention, the polyester fiber cords are impregnated with the RFL adhesive composition wherein the rubber latex contains at least one of chlorosulfonated polyethylene and alkylated chlorosulfonated polyethylene in an amount of 50–100% by weight based on the solid component of the latex, as well as at least one specific metal oxides and at least one sulfur containing vulcanization accelerators, and then heated and dried at a temperature of 200–270° C., thereby achieving excellent dynamic adhesion between the polyester fiber cords and the adhesive rubber layer formed of ethylene-α-olefin-diene rubber, while securing high productivity.

According to the invention, the polyester fiber cords may be treated with isocyanate or epoxy compounds before they are treated with the RFL adhesive composition. That is, the polyester fiber cords may be pre-treated by dipping in a solution of isocyanate or epoxy compounds, and then, if necessary, heated and dried.

The isocyanate compound usable in the invention is not specifically limited. The isocyanate compound usable includes, for example, tolylene diisocyanate, m-phenylene diisocyanate, diphenylmethane diisocyanate, hexamethylene diisocyanate and polymethylene polyphenyl polyisocyanate. In addition, there are used as equivalents of polyisocyanates such products as obtained by the addition reaction of polyhydric alcohols that have two or more active hydrogen atoms in the molecule such as trimethylolpropane or pentaerythritol to the polyisocyanate compounds as mentioned above, or blocked polyisocyanate compounds obtained by the reaction of blocking agents such as phenols, tertiary alcohols or secondary amines with the polyisocyanate compounds are also used in the invention.

The epoxy compound usable in the invention is also not specifically limited so far as it has two or more epoxy groups in the molecule. Accordingly, there may be mentioned as such epoxy compounds, for example, reaction products of polyhydric alcohols such as ethylene glycol, glycerin, sorbitol or pentaerythritol or, polyalkylene glycols such as polyethylene glycol with halogen-containing epoxy compounds such as epichlorohydrin. As further examples, there may be mentioned reaction products of polyfunctional phenols or phenol resins such as resorcin, bis(4-hydroxyphenyl) dimethylethane, phenol-formaldehyde resin, resorcin-formaldehyde resin with halogen-containing epoxy compounds such as epichlorohydrin.

The solvent to form solutions of the isocyanate or epoxy compounds is not specifically limited either, but water or organic solvents are used depending on the isocyanate or epoxy compounds used. Usually the isocyanate compounds are chemically so active that nonaqueous solutions are preferred. However, as mentioned above, such isocyanate compounds as blocked with, for example phenols, are stable so that aqueous solutions thereof may be used. As the organic solvent, aromatic hydrocarbons such as benzene, xylene or toluene, aliphatic ketones such as methyl ethyl ketone or methyl isobutyl ketone, aliphatic carboxylic acid alkyl esters such as ethyl acetate or amyl acetate may be used. The concentration of the solution of isocyanate or epoxy compound is usually in the range of 5–50% by weight.

Further according to the invention, the polyester fiber cords may be post-treated with rubber cement after they are adhesion treated with the RFL adhesive composition. The rubber cement used in the post-treatment is prepared by dissolving the same ethylene-α-olefin-diene rubber as used to form a compression layer or an adhesion rubber layer in an organic solvent to prepare a solution. In the post-treatment, the polyester fiber cords are dipped in the solution and heated and dried.

A compound of ethylene-α-olefin-diene rubber to prepare an adhesive rubber layer or a compression layer of the belt may contain such various additives as used in the rubber industry, for instance, reinforcements such as carbon black, silica, glass fibers or ceramic fibers, fillers such as calcium carbonate or talc, plasticizers, stabilizers, processing aids or colorants.

The ethylene-α-olefin-diene rubber compound may be prepared by uniformly mixing ethylene-α-olefin-diene rubber with the additives as mentioned above as required using a common mixing means such as rolls or Bumbury's mixer.

The power transmission belt of the invention is manufactured by processes commonly known in the art. By way of example, V-ribbed belt is manufactured as follows. One or more sheets of rubberized canvas and a first unvulcanized rubber sheet are wound on the smooth surface of a molding cylinder, and then the polyester fiber cords are wounded spirally thereon. A second unvulcanized rubber sheet is further wound on the first rubber sheet to interpose the polyester fiber cords between the pair of unvulcanized rubber sheets which are to form an adhesive rubber layer together. An unvulcanized rubber sheet which is to form a compression rubber layer is then wound on the second unvulcanized rubber sheet, thereby preparing a laminate.

The laminate is then heated under pressure in a vulcanizing vessel to effect vulcanization of the rubber sheets to provide a vulcanized annular product. The annular product is installed on a belt driving system comprised of a driving roll and a driven roll and is driven to run under a predetermined tension while a plurality of ribs are formed on the surface of the laminate with a suitable grinding wheel. The annular product having the ribs thereon is then installed on a second belt driving system and is driven to run while it is cut in round slices having a predetermined width thereby providing V-ribbed belts.

Industrial Availability of the Invention

As described above, the power transmission belt of the invention comprises a compression layer and an adhesive rubber layer both of which are formed of ethylene-α-olefin-diene rubber compound and which are adhered to each other by vulcanizing together and which has polyester fiber cords adhered to and embedded in the adhesive rubber layer. As a feature of the invention, the polyester fiber cords are adhesion treated with a resorcin-formalin-rubber latex (RFL) adhesive composition wherein the latex contains at least one of chlorosulfonated polyethylene and alkylated chlorosulfonated polyethylene in an amount of 50–100% by weight based on the solid components of the latex, and adhered to and embedded in the adhesive rubber layer. Thus, improved dynamic adhesion is realized between the polyester fiber cords and the adhesive rubber layer and hence the resulting belt has improved dynamic life.

Further according to the invention, the dynamic adhesion between the polyester fiber cords and the adhesive rubber layer is further improved when the polyester fiber cords are impregnated with a resorcin-formalin-rubber latex (RFL) adhesive composition which contains at least one specific metal oxides and at least one sulfur containing vulcanization accelerators and heated (baked) and dried at a temperature of 200–240° C. Thus, the process of the invention enables the highly efficient production of a high performance power transmission belt which has polyester fiber cords embedded therein.

EXAMPLES

The invention will be described in more detail with reference to examples below, but the invention is not limited thereto.

A rubber compound having the following composition by parts by weight was used as a compound to prepare an adhesive rubber layer of belt.

| | |
|---|---|
| Ethylene-propylene-diene rubber[1] | 100 parts |
| HAF carbon (Mitsubishi Kagaku K.K.) | 50 parts |
| Silica (Tokuseal Gu, Tokuyama K.K.) | 20 parts |
| Paraffin oil (Sunflex 2280, Japan Sun Kagaku K.K. | 20 parts |
| Vulcanizing agent (oil sulfur, Hosoi Kagaku K.K. | 3 parts |
| Vulcanizing accelerator (EP-150[2], Ouchi Shinko Kagaku K.K.) | 2.5 parts |
| Accelerator activator (stearic acid, Kao K.K.) | 1 part |
| Accelerator activator (zinc oxide, Sakai Kagaku Kogyo K.K.) | 5 parts |
| Antioxidant (224[3], Ouchi Shinko Kagaku K.K.) | 2 parts |
| Antioxidant (MB[4], Ouchi Shinko Kagaku K.K.) | 1 part |
| Tackifier (Quinton A-100, petroleum resin, Nippon Zeon K.K.) | 5 parts |
| Short fibers (cotton powder) | 2 parts |

A rubber compound having the following composition by parts by weight was used as a compound to prepare a compression layer of belt.

| | |
|---|---|
| Ethylene-propylene-diene rubber[1] | 100 parts |
| HAF carbon (Mitsubishi Kagaku K.K.) | 70 parts |
| Paraffin oil (Sunflex 2280, Japan Sun Kagaku K.K. | 20 parts |
| Vulcanizing agent (oil sulfur, Hosoi Kagaku K.K. | 1.6 parts |
| Vulcanizing accelerator (EP-150[2], Ouchi Shinko Kagaku K.K.) | 2.8 parts |
| Vulcanizing accelerator (MSA[5], Ouchi Shinko Kagaku K.K.) | 1.2 parts |
| Accelerator activator (stearic acid, Kao K.K.) | 1 part |
| Accelerator activator (zinc oxide, Sakai Kagaku Kogyo K.K.) | 5 parts |
| Antioxidant (224[3], Ouchi Shinko Kagaku K.K.) | 2 parts |
| Antioxidant (MB[4], Ouchi Shinko Kagaku K.K.) | 1 part |
| Short fibers (66 nylon fibers, 6 de × 1 mm) | 22 parts |

Notes:
[1]Ethylene content: 56% by weight, propylene content: 36.1% by weight, ethylidene norbornene (ENB) content: 5.5% by weight, dicyclopentadiene (DCP) content: 2.4% by weight, Mooney viscosity $ML_{1+4}$ (100° C.): 60
[2]Mixture of vulcanizing accelerator DM (dibenzothiadisulfide), TT (tetramethylthiuram disulfide) and EZ (zinc diethyldithiocarbamate)
[3]TMDQ (2,2,4-trimethyl-1,2-dihydroquinoline)
[4]2-mercaptobenzimidazole
[5]N-oxydiethylene-2-benzothiadisulfenamide

Example 1

Preparation of RFL Adhesive Composition 7.31 parts by weight of resorcin and 10.77 parts by of formalin (having a concentration of 37% by weight) were mixed together. An aqueous solution of sodium hydroxide (containing 0.33 parts by weight of sodium hydroxide) was added to the resulting mixture and stirred. Thereafter 160.91 parts by weight of water were added and the mixture was aged for 5 hours to provide an aqueous solution of resorcin-formalin resin (resorcin-formalin primary condensate, referred to RF) having a solid content of 6.40 % by weight.

Then, as shown in Table 1, a chlorosulfonated polyethylene rubber (CSM) latex was added to the aqueous RF solution and the resulting mixture was aged for 12 hours to provide a resorcin-formalin-latex (RFL) adhesive composition C having the composition as shown in Table 1.

Preparation of Adherend of Polyester Fiber Cords and Adhesive Rubber Layer and Measurement of its Adhesive Strength Polyester (polyethylene terephthalate) fiber cords prepared by first twisting of filaments and final twisting of the resulting strands were dipped in a toluene solution of isocyanate (having a solid content of 20% by weight) and heated and dried at a temperature of 240° C. for 40 seconds to effect pretreatment of polyester fiber cords.

The thus pretreated polyester fiber cords were first dipped in a first RFL adhesive composition C having the composition as shown in Table 2 and heated and dried at a temperature of 200° C. for 80 seconds to effect the first RFL treatment. The polyester fiber cords were then dipped in a second RFL adhesive composition C (the same as the first RFL adhesive composition C) and heated and dried at a temperature of 200° C. for 80 seconds to effect the second (final) RFL treatment.

The polyester fiber cords were then dipped in an adhesive solution (rubber cement) prepared by dissolving the same ethylene-propylene-diene rubber as used to prepare the adhesive rubber layer and was heated and dried at a temperature of 60° C. for 40 seconds thereby to effect post-treatment of the polyester fiber cords.

The polyester fiber cords thus treated was placed between a couple of sheets of ethylene-propylene-diene rubber compound which are to form an adhesive rubber layer, press-vulcanized at a temperature of 160° C. and under a face pressure of 3920 kPa for 35 minutes. The adhesive strength between the polyester fiber cords and the adhesive layer was measured and the manner of destruction in the adherend was observed. The results are shown in Table 2.

Manufacturing of Power Transmission Belt and Evaluation of Dynamic Life Thereof In the same manner as described before, a sheet of rubberized canvas and a first unvulcanized rubber sheet to form an adhesive rubber layer were wound on the smooth surface of a molding cylinder, and then polyester fiber cords are wounded spirally thereon. A second unvulcanized rubber sheet to form an adhesive rubber layer jointly with the first unvulcanized rubber sheet is further wound on the polyester fiber cords to place the polyester fiber cords between the first and second unvulcanized rubber sheets. An unvulcanized rubber sheet which is to form a compression layer is then wound on the second unvulcanized rubber sheet to form a laminate.

The laminate is then heated at a temperature of 165° C. and an inner pressure of 6 kgf/cm² and outer pressure of 9 kgf/cm² for 35 minutes, thereby steam vulcanizing the laminate to provide an annular product. The annular product was installed on a driving system comprised of a driving roll and a driven roll and is driven to run under a predetermined tension while a plurality of ribs are formed on the surface of the laminate with a suitable grinding wheel. The annular product having the ribs thereon is then installed on a second driving system and is driven to run while it is cut in round slices of a predetermined width thereby providing V-ribbed belts having three ribs and a length of 1000 mm.

Figure 3:
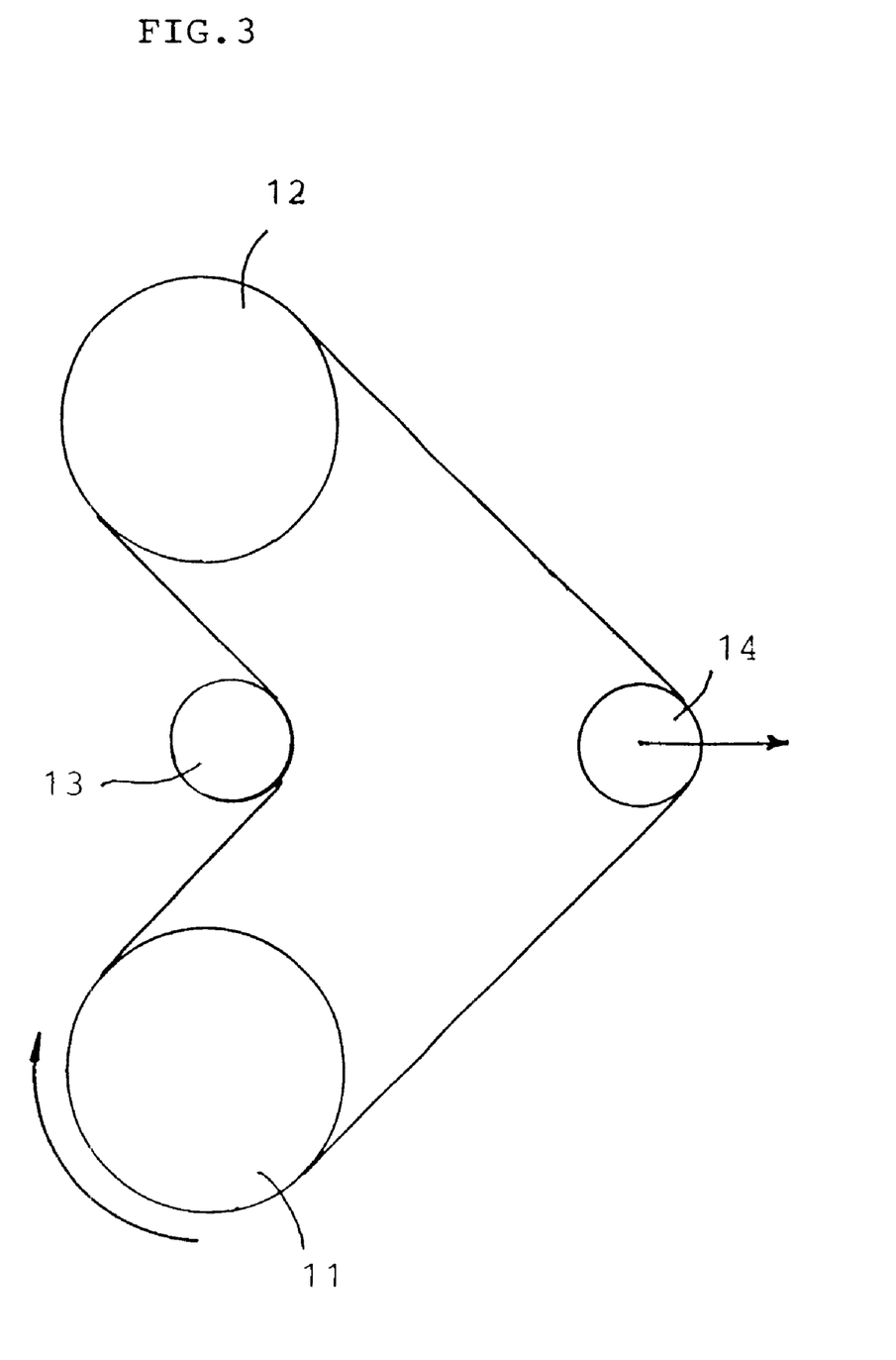
FIG. 3 shows a belt driving system to carry out a dynamic test of power transmission belts.

The V-ribbed belt was installed on a belt driving system comprised of a drive pulley 11 (having a diameter of 120 mm), a driven pulley 12 (having a diameter of 120 mm), an idler pulley 13 (having a diameter of 70 mm) and a tension pulley 14 (having a diameter of 55 mm) with the latter two being placed between the drive pulley and the driven pulley, as shown in FIG. 3. The belt was engaged with the idler pulley at its back.

Under an ambient temperature of 110° C., the drive pulley was driven to rotate at 4900 rpm with a load of 16 h.p. on the driven pulley. A tension of 85 kgf was initially applied to the belt with the tension pulley. The time (hours) until the fiber cords were exposed or cracks were generated in the rubber layer was measured and taken as the dynamic life of the belt. The results are shown in Table 2.

Example 2

A chlorosulfonated polyethylene rubber (CSM) latex and a latex of a copolymer of 2-chloro-1,3-butadiene and 2,3-di-chloro-1,3-butadiene (DCB) were added to the same RF solution as used in Example 1 and aged for 12 hours to prepare a resorcin-formalin-latex (RFL) adhesive composition D having the composition as shown in Table 1.

The same polyester fiber cords as used in Example 1 were dipped in a toluene solution of isocyanate (having a solid content of 20% by weight) and heated and dried at a temperature of 240° C. for 40 seconds to effect pretreatment of polyester fiber cords.

The thus pretreated polyester fiber cords were first dipped in a first RFL adhesive composition D having the composition as shown in Table 2 and heated and dried at a temperature of 220° C. for 80 seconds to effect the first RFL treatment. The polyester fiber cords were then dipped in a second RFL adhesive composition D (the same as above) and heated and dried at a temperature of 220° C. for 80 seconds to effect the second (final) RFL treatment.

The polyester fiber cords were then dipped in an adhesive solution (rubber cement) prepared by dissolving the same ethylene-propylene-diene rubber as used to prepare the adhesive layer and was heated and dried at a temperature of 60° C. for 40 seconds thereby to effect post-treatment of the polyester fiber cords.

The polyester fiber cords thus treated was placed between a pair of sheets of unvulcanized ethylene-propylene-diene rubber compound which were to form an adhesive rubber layer and vulcanized in the same manner as in Example 1. The adhesive strength between the polyester fiber cords and the adhesive layer of the resulting adherend was measured. A V-ribbed belt was manufactured in the same manner as in Example 1 and its dynamic life was measured. The results are shown in Table 2.

Comparative Example 1

A styrene-butadiene-vinylpyridine copolymer (VP) latex was added to the same RF solution as that used in Example 1 and aged for 12 hours to prepare a resorcin-formalin-latex (RFL) adhesive composition A having the composition as shown in Table 1.

The same polyester fiber cords as used in Example 1 were dipped in a toluene solution of isocyanate (having a solid content of 20% by weight) and heated and dried at a temperature of 240° C. for 40 seconds to effect pretreatment of polyester fiber cords.

The thus pretreated polyester fiber cords were first dipped in a first RFL adhesive composition A having the composition as shown in Table 2 and heated and dried at a temperature of 220° C. for 80 seconds to effect the first RFL treatment. The polyester fiber cords were then dipped in a second RFL adhesive composition A (the same as above) and heated and dried at a temperature of 220° C. for 80 seconds to effect the second (final) RFL treatment.

The polyester fiber cords were then dipped in an adhesive solution (rubber cement) prepared by dissolving the same ethylene-propylene-diene rubber as used to prepare the adhesive rubber layer and was heated and dried at a temperature of 60° C. for 40 seconds thereby to effect post-treatment of the polyester fiber cords.

The polyester fiber cords thus treated was placed between a pair of sheets of unvulcanized ethylene-propylene-diene rubber compound which were to form an adhesive rubber layer and vulcanized in the same manner as in Example 1. The adhesive strength between the polyester fiber cords and the adhesive layer of the resulting adherend was measured. A V-ribbed belt was manufactured in the same manner as in Example 1 and its dynamic life was measured. The results are shown in Table 2.

Comparative Example 2

A chloroprene rubber (CR) latex was added to the same RF solution as used in Example 1 and aged for 12 hours to prepare a resorcin-formalin-latex (RFL) adhesive composition B having the composition as shown in Table 1.

The same polyester fiber cords as used in Example 1 were dipped in a toluene solution of isocyanate (having a solid content of 20% by weight) and heated and dried at a temperature of 240° C. for 40 seconds to effect pretreatment of polyester fiber cords.

The thus pretreated polyester fiber cords were first dipped in a first RFL adhesive composition B having the composition as shown in Table 2 and heated and dried at a temperature of 220° C. for 80 seconds to effect the first RFL treatment. The polyester fiber cords were then dipped in a second RFL adhesive composition B (the same as above) and heated and dried at a temperature of 220° C. for 80 seconds. The polyester fiber cords were then dipped in an adhesive solution (rubber cement) prepared by dissolving the same ethylene-propylene-diene rubber as used to prepare the adhesive rubber layer and was heated and dried at a temperature of 60° C. for 40 seconds thereby to effect post-treatment of the polyester fiber cords.

The polyester fiber cords thus treated was placed between a pair of sheets of unvulcanized ethylene-propylene-diene rubber compound which were to form an adhesive rubber layer and vulcanized in the same manner as in Example 1. The adhesive strength between the polyester fiber cords and the adhesive layer of the resulting adherend was measured. A V-ribbed belt was manufactured in the same manner as in Example 1 and its dynamic life was measured. The results are shown in Table 2.

TABLE 1

|  | RFL | | | |
| --- | --- | --- | --- | --- |
|  | A | B | C | D |
| Compositions of RFL (parts by weight) | | | | |
| RF solution (solid content) | 1.39 | 1.39 | 1.39 | 1.39 |
| VP[1](solid content) | 13.49 | | | |
| CR[2](solid content) | | 13.49 | | |
| CSM[3](solid content) | | | 13.49 | 6.74 |
| DCB[4](solid content) | | | | 4.32 |
| Solid content of RFL (% by weight) | 20 | 20 | 20 | 20 |

Notes:
[1]Vinylpyridine latex (solid content: 40% by weight) available from Nihon Gosei Gomu K.K.
[2]Chloroprene rubber latex (solid content: 50% by weight) available from Showa Denko K.K.
[3]Chlorosulfonated polyethylene latex (solid content: 40% by weight) available from Sumitomo Seika K.K.
[4]Latex of copolymer of 2-chloro-1,3-butadiene and 2,3-dichloro-1,3-butadiene (solid content: 32% by weight) available from Toso K.K.

TABLE 2

|  | Comparative Examples | | Examples | |
| --- | --- | --- | --- | --- |
|  | 1 | 2 | 1 | 2 |
| RFL used in the first treatment | A | B | C | D |
| RFL used in the final treatment | A | B | C | D |
| Adhesion strength of fiber cords (kgf/3 cords) | 5.0 | 3.0 | 11.7 | 12.5 |
| Dynamic life of belt (hours) | 1.5 | 0.5 | 111.0 | 122.0 |
| Manner of belt destruction | a | a | b | b |

Notes:
a) Fiber cords exposed
b) Rubber layer cracked

Examples 3–8

A CSM latex (and a DCB latex) were added to the same RF solution as used in Example 1 together with an aqueous dispersion of vulcanization accelerator DM (dibenzothiazyl disulfide) and zinc oxide and aged for 12 hours to prepare resorcin-formalin-latex (RFL) adhesive compositions E to J each having the composition as shown in Table 3.

The same polyester fiber cords as used in Example 1 were dipped in a toluene solution of isocyanate (having a solid content of 20% by weight) and heated and dried at a temperature of 240° C. for 40 seconds to effect pretreatment of polyester fiber cords.

The thus pretreated polyester fiber cords were first dipped in a first RFL adhesive composition having the composition as shown in Table 4 and heated and dried at a temperature of 220° C. for 80 seconds to effect the first RFL treatment. The polyester fiber cords were then dipped in a second RFL adhesive composition having the composition as shown in Table 4 and heated and dried at a temperature of 220° C. for 80 seconds to the second (final) RFL treatment.

The polyester fiber cords were then dipped in an adhesive solution (rubber cement) prepared by dissolving the same ethylene-propylene-diene rubber as used to prepare the adhesive rubber layer and was heated and dried at a temperature of 60° C. for 40 seconds thereby to effect post-treatment of the polyester fiber cords.

The polyester fiber cords thus treated was placed between a pair of sheets of unvulcanized ethylene-propylene-diene rubber compound which were to form an adhesive rubber layer and vulcanized in the same manner as in Example 1. The adhesive strength between the polyester fiber cords and the adhesive layer of the resulting adherend was measured.

V-ribbed belts were manufactured using each of the resulting adherends in the same manner as in Example 1 and their dynamic life was measured. As the results are shown in Table 4, all the belts were destroyed as the results of exposure of the fiber cords.

TABLE 3

| | RFL | | | | | |
|---|---|---|---|---|---|---|
| | E | F | G | H | I | J |
| Compositions of RFL (parts by weight) | | | | | | |
| RF solution (solid content) | 1.39 | 1.39 | 1.39 | 1.39 | 1.39 | 1.39 |
| CSM latex (solid content) | 13.49 | 13.49 | 13.49 | 6.74 | 6.74 | 6.74 |
| DCB latex (solid content) | | | | 4.32 | 4.32 | 4.32 |
| DM/ZnO[5] | 1.16 | 0.87 | 0.12 | 0.95 | 0.71 | 0.10 |
| Solid content of RFL (% by weight) | 18 | 19 | 20 | 18 | 19 | 20 |

Notes:
[5]Aqueous dispersion of mixture of vulcanization accelerator DM and zinc oxide in a weight ratio of 5/1 (solid content of 43% by weight)

TABLE 4

| | Examples | | | | | |
|---|---|---|---|---|---|---|
| | 3 | 4 | 5 | 6 | 7 | 8 |
| RFL used in the first treatment | E | F | G | E | F | G |
| RFL used in the final treatment | E | F | G | H | I | J |
| Adhesion strength of fiber cords (kgf/3 cords) | 15.8 | 16.3 | 14.5 | 17.1 | 18.7 | 16.4 |
| Dynamic life of belt (hours) | 299.0 | 315.0 | 270.0 | 305.0 | 330.0 | 272.0 |

Examples 9–13 and Comparative Example 3

The same polyester fiber cords as used in Example 1 were dipped in a toluene solution of isocyanate (having a solid content of 20% by weight) and heated and dried at a temperature of 240° C. for 40 seconds to effect pretreatment of polyester fiber cords.

The thus pretreated polyester fiber cords were first dipped in a first RFL adhesive composition having the composition as shown in Table 5 and heated and dried at a predetermined temperature for 80 seconds to effect the first RFL treatment. The polyester fiber cords were then dipped in a second RFL adhesive composition having the composition as shown in Table 5 and heated and dried at a predetermined temperature for 80 seconds to effect the second RFL treatment.

The polyester fiber cords were then dipped in an adhesive solution (rubber cement) prepared by dissolving the same ethylene-propylene-diene rubber as used to prepare the adhesive layer and was heated and dried at a temperature of 60° C. for 40 seconds thereby to effect post-treatment of the polyester fiber cords.

The polyester fiber cords thus treated was placed between a pair of sheets of ethylene-propylene-diene rubber compound which were to form an adhesive rubber layer and vulcanized in the same manner as in Example 1. The adhesive strength between the polyester fiber cords and the adhesive layer of the resulting adherend was measured.

V-ribbed belts were manufactured using each of the resulting adherends in the same manner as in Example 1 and their dynamic life was measured. The results are shown in Table 5 in which the stable tension means a belt tension when the belt runs stably.

According to the invention, polyester fiber cords can be bonded firmly to the adhesive rubber layer by impregnating the cords with the RFL adhesive composition and then heating (baking) and dried at a temperature of 200–240° C., and hence a power transmission belt which has improved dynamic life is obtained.

TABLE 5

| | Examples | | | | | Comparative Example |
|---|---|---|---|---|---|---|
| | 9 | 10 | 11 | 12 | 13 | 3 |
| RFL used in the first treatment | C | C | C | C | I | C |
| RFL used in the final treatment | C | C | C | C | I | C |
| Cords baking temperature (° C.) | 170 | 200 | 220 | 230 | 230 | 245 |
| Adhesion strength of fiber cords (kgf/3 cords) | 12.1 | 11.7 | 12.5 | 11.5 | 14.5 | 5.5 |
| Dynamic life of belt (hours) | 24.0 | 111.0 | 122.0 | 105.0 | 114.5 | 2.0 |
| Belt destruction | a | b | b | b | b | c |
| Stable tension (kgf) | 19 | 32 | 33 | 33 | 33 | 33 |

Notes:
a) Belt slipped
b) Rubber layer cracked
c) Cords exposed

What is claimed is:

1. A power transmission belt that comprises a compression layer and an adhesive rubber layer adhered to each other by vulcanizing together and which has polyester fiber cords embedded in the adhesive rubber layer, wherein the compression layer and the adhesive rubber layer are formed of vulcanizate of an ethylene-α-olefin-diene rubber compound and wherein the polyester fiber cords are adhesion treated with a resorcin-formalin-rubber latex adhesive composition wherein the rubber latex comprises at least one of chlorosulfonated polyethylene and alkylated chlorosulfonated polyethylene in an amount of 50–95% by weight and a copolymer of 2-chloro-1,3-butadiene and 2,3-dichloro-1,3- butadiene in an amount of 5–45% by weight, based on the solid components of the rubber latex, respectively, and adhered to and embedded in the adhesive rubber layer.

2. The power transmission belt as claimed in claim 1 wherein the ethylene-α-olefin-diene rubber is a copolymer rubber formed of ethylene and at least one α-olefin selected from the group consisting of propylene, butene, hexene and octene.

3. The power transmission belt as claimed in claim 1 wherein the resorcin-formalin-rubber latex adhesive composition contains 0.5–10 parts by weight of at least one metal oxide selected from the group consisting of zinc oxide, magnesium oxide and lead oxide and 0.1–20 parts by weight of at least one vulcanization accelerator selected from the group consisting of thiazoles, sulfenamides, thiurams and dithiocarbamates, relative to 100 parts by weight of the solid components of the rubber latex, respectively.

4. A process for production of a power transmission belt that comprises a compression layer and an adhesive rubber layer adhered to each other by vulcanizing together and which has polyester fiber cords embedded in the adhesive rubber layer, which comprises:

carrying out adhesion treatment of the polyester fiber cords, which comprises impregnating the polyester fiber cords with a resorcin-formalin-rubber latex adhesive composition wherein the rubber latex comprises at least one of chlorosulfonated polyethylene and alkylated chlorosulfonated polyethylene in an amount of 50–95% by weight and a copolymer of 2-chloro-1,3-butadiene and 2,3-dichloro-1,3-butadiene in an amount of 5–45% by weight, based on the solid components of the rubber latex, respectively, as well as at least one metal oxide selected form the group consisting of zinc oxide, magnesium oxide and lead oxide and at least one sulfur containing vulcanization accelerator selected from the groups consisting of thiazoles, sulfenamides, thiurams and dithiocarbamates, relative to 100 parts by weight of the solid components of the rubber latex, respectively, and heating and drying the resulting polyester fiber cords at a temperature of 200–240° C.;

placing the resulting polyester fiber cords between a pair of sheets formed of unvulcanized ethylene-a-olefin-diene rubber compound which are to form an adhesive rubber layer;

laminating the said pair of sheets formed of unvulcanized ethylene-α-olefin-diene rubber compound on a sheet formed of unvulcanized ethylene-α-olefin-diene rubber compound which is to form a compression layer; and heating the resulting laminate under pressure to vulcanize the laminate in a body to provide the belt wherein the polyester fiber cords are adhered to and embedded in the adhesive rubber layer.

5. The process as claimed in claim 4 herein the ethylene-α-olefin-diene rubber is a copolymer rubber formed of ethylene and at least one α-olefin selected from the group consisting of propylene, butene, hexene and octene.

\* \* \* \* \*